United States Patent [19]

Kurahashi et al.

[11] 3,711,643

[45] Jan. 16, 1973

[54] APPARATUS FOR REPRODUCING VIDEO INFORMATION IN SLOW MOTION

[75] Inventors: Koichiro Kurahashi; Masanori Nakada, both of Amagasaki; Koichi Nishimura, Kamakura; Masaaki Abe, Kyoto-fu, all of Japan

[73] Assignee: Mitsubishi Electric Corporation, Tokyo, Japan

[22] Filed: Nov. 5, 1970

[21] Appl. No.: 87,076

[30] Foreign Application Priority Data

Nov. 7, 1969 Japan ................................44/89091

[52] U.S. Cl...............................178/7.2, 178/DIG. 28

[51] Int. Cl.................................................H04n 5/36

[58] Field of Search........178/DIG. 28, 7.2, 6.7 A, 5.4 CR; 315/10

[56] References Cited

UNITED STATES PATENTS

| | | | |
|---|---|---|---|
| 2,922,841 | 1/1960 | Graziano | 178/DIG. 28 |
| 2,839,602 | 6/1958 | Fries | 178/6.7 A |
| 2,291,723 | 8/1942 | Jensen | 178/7.2 D |

*Primary Examiner*—Robert L. Griffin
*Assistant Examiner*—Donald E. Stouf
*Attorney*—Oblon, Fisher & Spivak

[57] ABSTRACT

An apparatus for reproducing video information recorded on a film by use of a flying spot scanner. A particular sawtooth waveform signal is used for vertical scanning of the film so that slow motion reproduction is provided. The particular sawtooth signal is composed from a first sawtooth signal produced by synchronizing a synchronizing mark recorded upon the recording media and a second sawtooth signal produced by frequency pulse dividing in synchronism with the first sawtooth signal.

5 Claims, 12 Drawing Figures

INVENTORS
KOICHIRO KURAHASHI
MASANORI NAKADA
MASAAKI ABE
KOICHI NISHIMURA
BY
Oblon, Fisher and Spivak
ATTORNEYS INVENTORS
KOICHIRO KURAHASHI
MASANORI NAKADA
MASAAKI ABE
KOICHI NISHIMURA
BY
Oblon, Fisher and Spivak
ATTORNEYS INVENTORS
KOICHIRO KURAHASHI
MASANORI NAKADA
MASAAKI ABE
KOICHI NISHIMURA
BY
Oblon, Fisher and Spivak
ATTORNEYS

INVENTORS
KOICHIRO KURAHASHI
MASANORI NAKADA
MASAAKI ABE
KOICHI NISHIMURA

BY

Oblon, Fisher and Spivak
ATTORNEYS

APPARATUS FOR REPRODUCING VIDEO INFORMATION IN SLOW MOTION

BACKGROUND OF THE INVENTION

1. Field of the Invention

The present invention generally relates to an apparatus for reproducing video information recorded on a recording media, and more particularly to an apparatus for enabling slow motion reproduction in a vertical scanning system.

2. Description of the Prior Art

In the past, a need existed for an apparatus for reproducing video information in slow motion which apparatus would be easy to construct and would be accurate in reproducing.

SUMMARY OF THE INVENTION

Accordingly, it is one object of the present invention to provide a new and improved apparatus for reproducing video information in slow motion by accurately controlling a composite sawtooth waveform applied to a vertical scanning circuit of a flying spot scanner.

It is another object of the present invention to provide a new and improved apparatus for reproducing video information in slow motion which is simple to construct.

One further object of the present invention is to provide a new and improved apparatus for accurately and easily scanning a recording media and for enabling information to be reproduced in slow motion.

Briefly, in accordance with the present invention, the foregoing and other objects are attained, in one aspect, by the provision of an apparatus for reproducing video information from a recording media having video information recorded thereon. A flying spot scanning circuit which is driven by a horizontal scanner and a vertical scanner for scanning the video information is provided in connection with a first and a second sawtooth wave generator, each of which generates a waveform having the same amplitude, and wherein both of the generators are used to drive the vertical scanner. Additional means are provided for controlling the period of the output waveform of the first sawtooth wave generator so that the same will coincide with particular ones of the reproducing frames per second and for controlling the period of the output waveform of the second sawtooth wave generator so that the same will be a specific value depending upon the velocity of movement of the recording media and particular ones of the reproducing frames per second. The vertical scanner will then provide a composite sawtooth wave signal from the outputs of the first and second sawtooth wave generators applied thereto such that the video information may be readily reproduced in slow motion by vertically scanning with the composite sawtooth wave signal in the direction of movement of the recording media.

BRIEF DESCRIPTION OF THE DRAWINGS

A more complete appreciation of the invention will be readily obtained as the same becomes better understood by reference to the following detailed description when considered in connection with the accompanying drawings, wherein.

DETAILED DESCRIPTION OF THE PREFERRED EMBODIMENTS

Figure 1:
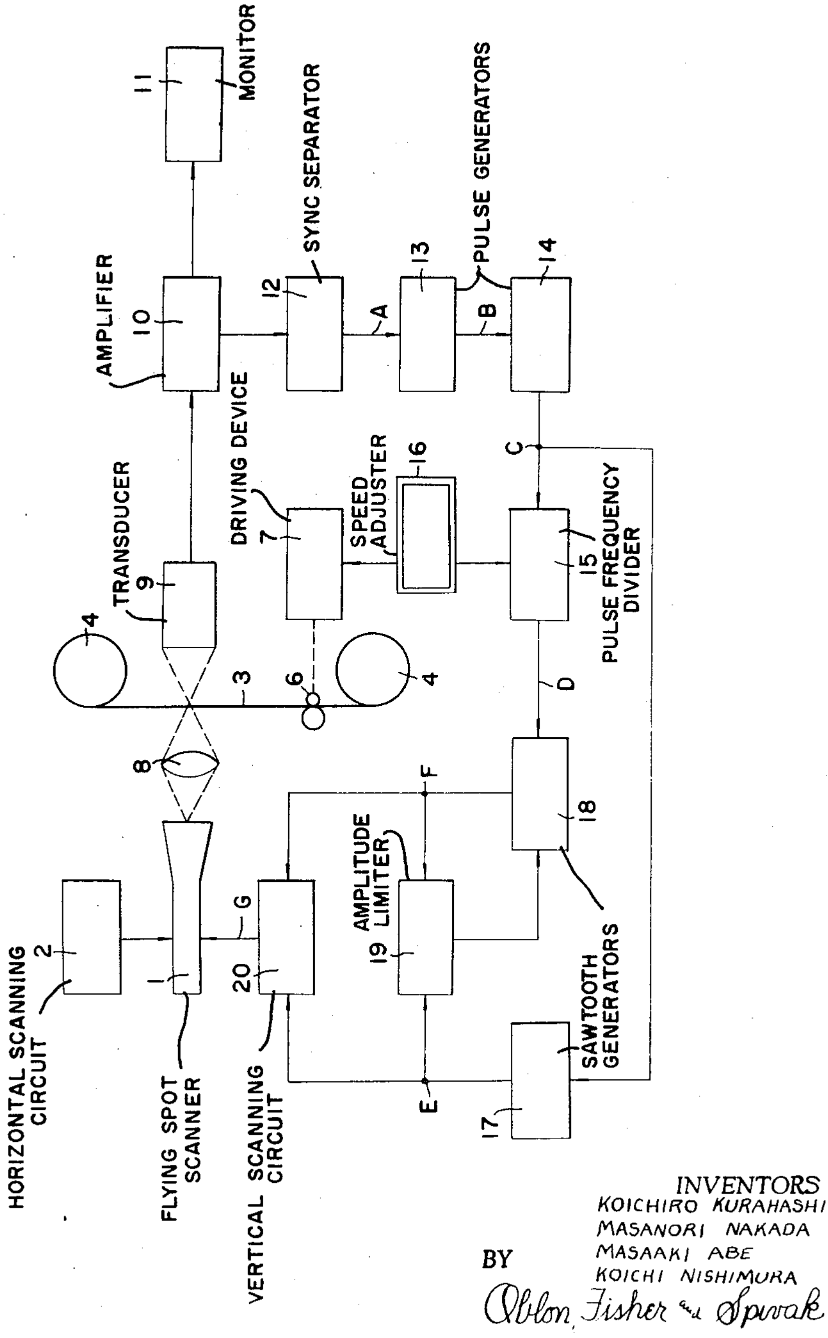
FIG. 1 is a schematic block diagram of one preferred embodiment of an apparatus for reproducing video information in accordance with the present invention.

Referring now to the Drawings, wherein like reference numerals designate identical, or corresponding parts throughout the several views, and more particularly to FIG. 1 thereof, wherein the apparatus for reproducing video information according to the present invention is shown as including a flying spot scanner 1 and a horizontal scanning circuit 2 for enabling a luminous spot on the tube surface of the flying spot scanner 1 to move at a constant velocity thereacross. An optical film 3 for recording video information thereon is provided along with a mechanism 4 for supplying and taking up the film 3. A pinch roller 5 and a capstan device 6 are provided for enabling the optical film 3 to move at a constant velocity. A driving device 7 is provided for driving the capstan 6.

A lens system 8 is provided for projecting an image from the luminous spot of the flying spot scanner 1 onto the optical film 3. A photoelectric transducer 9 is provided for detecting the intensity of transmission of light of the luminous spot which is projected on the optical film 3 for converting the same into an electrical signal. A video signal amplifier 10 is provided for amplifying the output of the photoelectric transducer 9. The output of the amplifier 10 is connected to a TV monitor 11 which is used for reproducing the video information read from the optical film 3. A synchronizing signal separator 12 is provided and also connected to the output of the amplifier 10 for producing a synchronizing mark signal A from the output of the photoelectric transducer 9. A first pulse generating circuit 13 is provided for generating a pulse B having a constant pulse width. The pulse generating circuit 13 is triggered by the synchronizing mark signal A which was provided by the synchronizing signal separator 12. A second pulse generating circuit 14 is provided for generating a pulse C having a short width in comparison with the vertical scanning period of the pulse B and the same rises at the end of the output pulse B of the first pulse generating circuit 13. A pulse frequency divider 15 is provided for enabling a pulse D to be obtained by dividing the frequency of the output pulse C of the second pulse generating circuit 14. A speed adjuster 16 is provided for changing the slow motion velocity desired by simultaneously changing the driving velocity of the capstan driver 7 and the frequency dividing ratio of the pulse frequency divider 15. A first sawtooth wave generator 17 is provided and the fly-back time and initiation of the fly-back of the sawtooth wave E generated is controlled by the output pulse C of the second pulse generating circuit 14. A second sawtooth wave generator 18 is provided and the fly-back time and initiation of the fly-back of the sawtooth wave F generated is controlled by the output pulse D of the pulse frequency divider 15. A amplitude limiter 19 is provided for enabling the peak value of the output E of the first sawtooth wave generator 18 to coincide with the peak value of the output F of the second sawtooth wave generator 17. A vertical scanning circuit 20 is provided for controlling the vertical position of the luminous spot of the flying spot scanning tube by generating a composite sawtooth shaped wave G which is composed from the two sawtooth waveforms E and F. It should be understood that the optical film 3 is scanned by the vertical scanning circuit 20 together with the horizontal scanning circuit 2 and the capstan mechanism 6.

Figure 5:
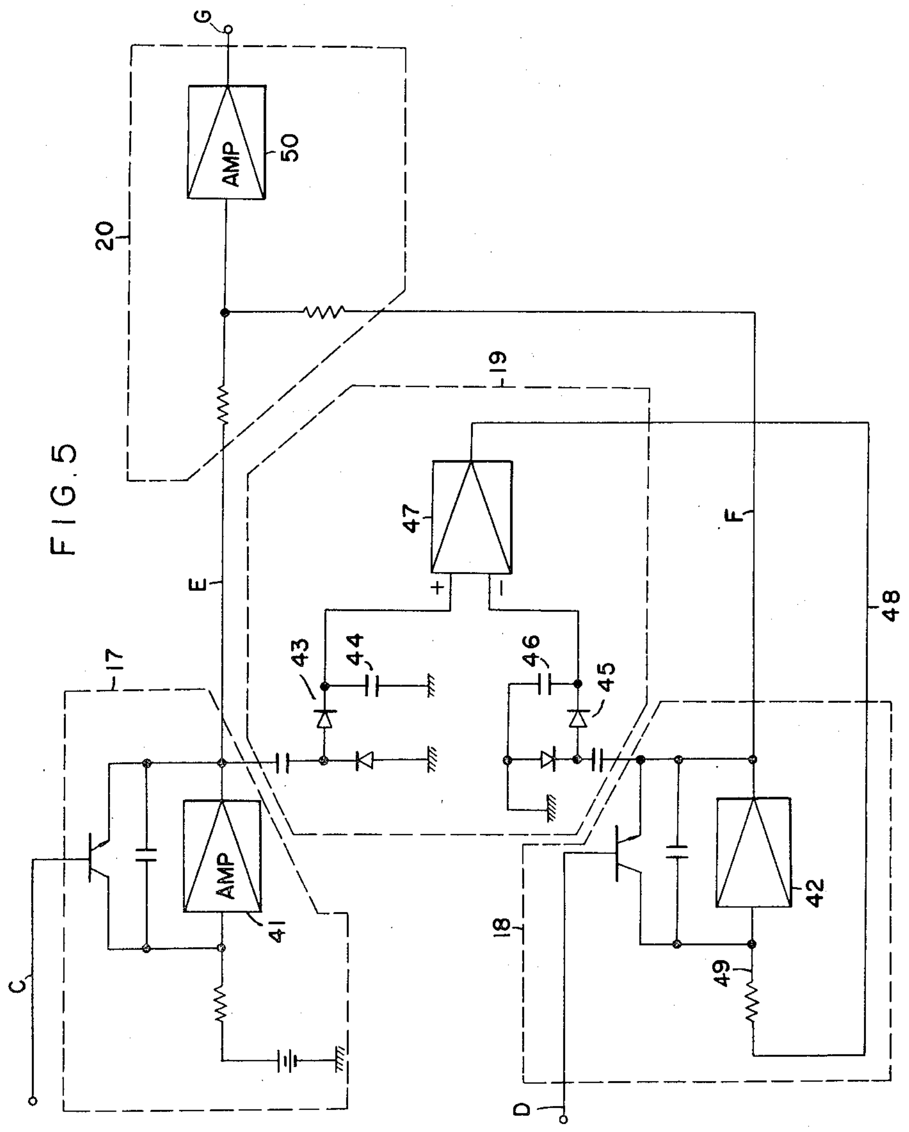

Referring now to FIG. 5, a detailed schematic diagram of a portion of the block diagram shown in FIG. 1 is provided and is shown as including the first sawtooth wave generator 17, the second sawtooth wave generator 18, the amplitude limiter 19, and the vertical scanning circuit 20. The first sawtooth wave generator 17 is an integrating device and includes an amplifier 41 which generates the output E. An output from the generator 17 is applied to a rectifier 43 upon receipt of the input signal C. An output signal which is proportional to the amplitude of the first sawtooth wave signal is applied to a capacitor 44 of the rectifier 43.

The second sawtooth generator 18 is also an integrating device and includes an amplifier 42 which generates the output F. An output from the generator 18 is applied to a rectifier 45 upon receipt of the input signal D. An output signal which is proportional to the amplitude of the second sawtooth wave signal is applied to a capacitor 46 of the rectifier 45. A differential amplifier 47 is provided and applies the differential voltage output therefrom through a line 48 to an input terminal 49 of the second sawtooth wave generator 18. The differential amplifier 47 detects the difference in amplitude between the sawtooth waves provided by the first sawtooth generator 17 and the second sawtooth generator 18 to enable the peak amplitude of the second sawtooth wave generator 18 to be controlled so as to coincide with the peak amplitude of the sawtooth wave provided by the first sawtooth wave generator 17. In FIG. 5, the vertical scanning circuit 20 is shown as including a power amplifier 50. The sawtooth wave outputs E and F which have coinciding amplitudes are added to the inputs of the vertical scanning circuit 20 through respective summing resistors so as to generate the composite sawtooth wave signal G.

Figure 2:
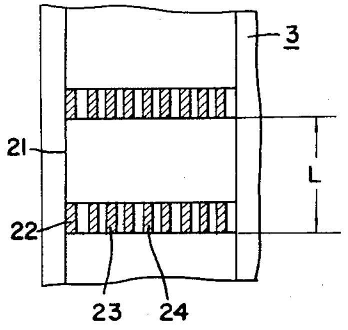
FIG. 2 is a partial enlarged view of an optical film used for the apparatus of FIG. 1.

In FIG. 2, a partial enlarged view of the optical film 3 of FIG. 1 is shown. The optically recorded video information is indicated by the reference numeral 21. On the film 3, a vertical synchronizing mark 22 is inserted between each section of the video informations 21. The reference numeral 23 indicates a transparent vertical pattern which is a part of the vertical synchronizing mark. An opaque vertical pattern 24 is also provided and has the same width as the transparent vertical pattern 23. It should be understood that the vertical synchronizing mark 22 is thereby formed of the transparent pattern 23 and the opaque pattern 24.

Figure 3:
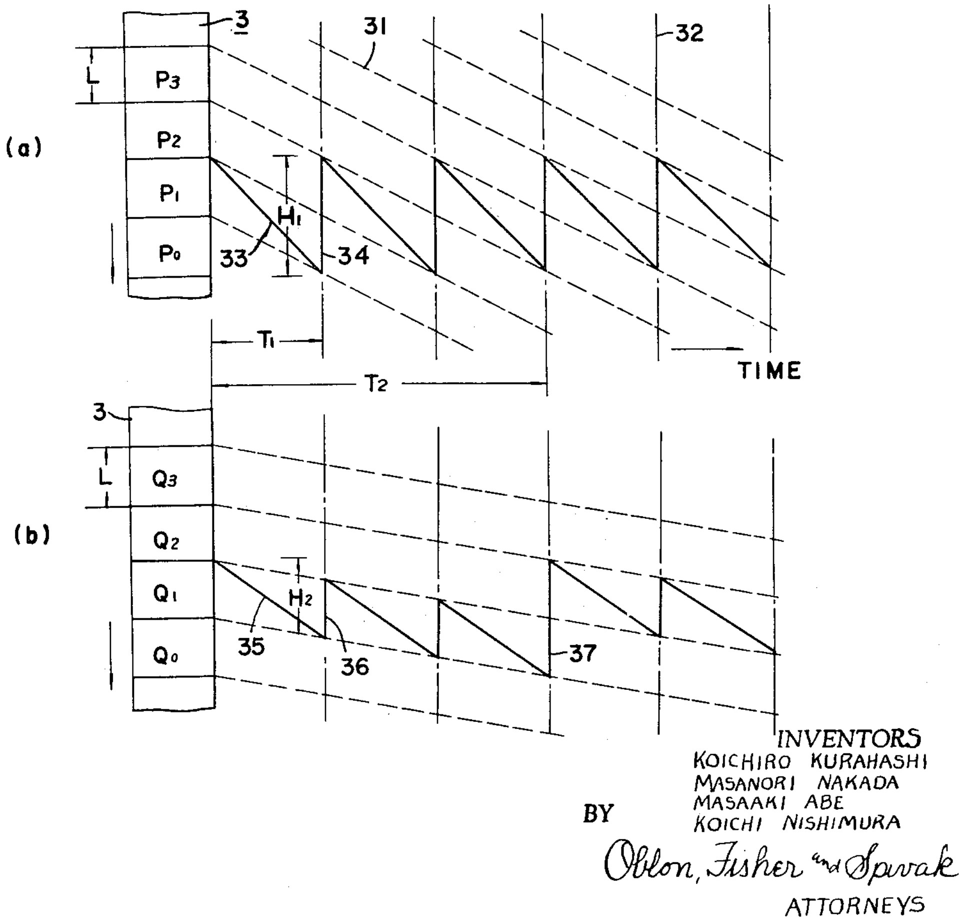
FIGS. 3*a* and 3*b* are diagrams of signals for showing various operations of the apparatus of FIG. 1.

Referring now to FIG. 3, the periodical change in the relationship between the optical film 3 as it is driven by the capstan device 6 and the luminous intensity of the vertical scanning performed by the vertical scanning circuit 20 is therein shown. In FIGS. *3a* and *b*, it should be understood that time is shown on the abscissa axis and that the position along the optical film 3 is shown on the ordinate axis. The optical film 3 on which the video information is recorded is shown by the arrow as driving downward in the direction of P;0, 1, 2, 3, . . . and Q; 1, 2, 3, . . . A typical point, such as the right edge point of the optical film 3, will move along the broken line 31 with respect to time. Accordingly, the broken lines 31 show the moving position of the film for each point in time. Vertical lines 32 show points of coincidence in time. The solid lines 33 through 37 show the position of the luminous spot as it moves in a vertical direction. It should be understood that in order to simply the Drawings, the synchronizing marks are not separately shown, but are taken as being included in the video information portions P or Q.

Figure 4:
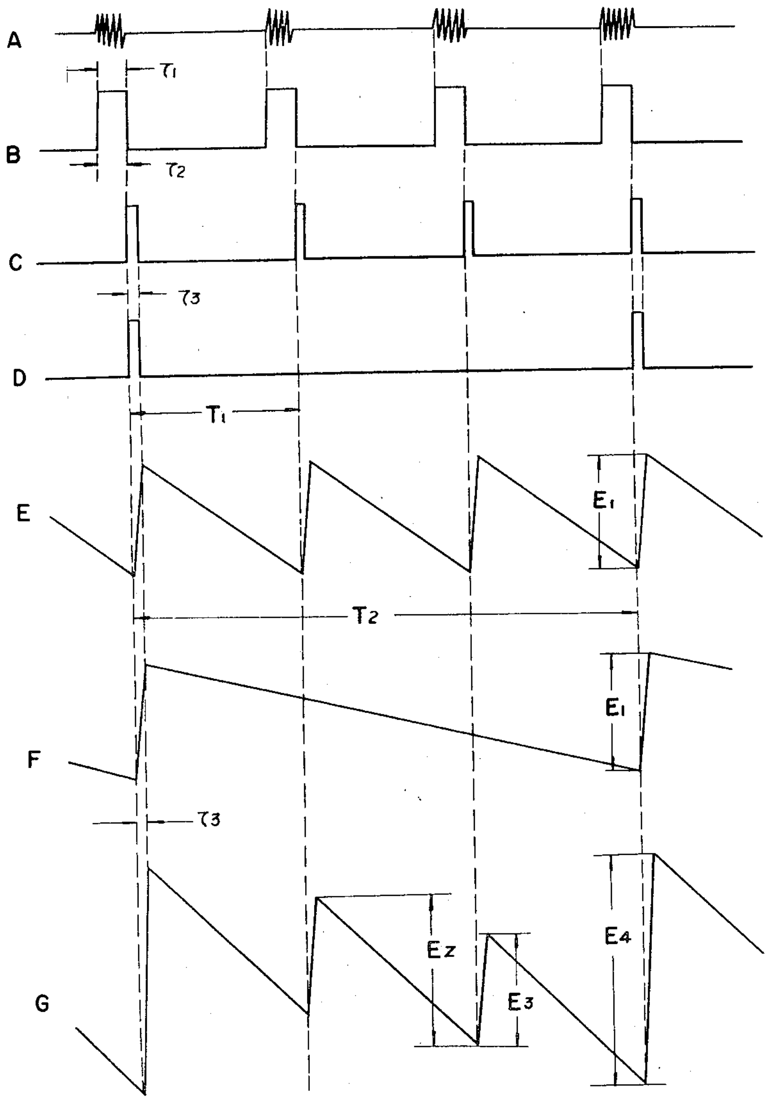
FIGS. 4A–4G show diagrams of various signal waveforms at various locations in the apparatus of FIG. 1; and, FIG. 5 is a detailed schematic diagram of a portion of the apparatus shown in FIG. 1.

The operation of the apparatus of the present invention will now be described, in connection with FIG. 4, which illustrates various waveforms appearing at selected points along the apparatus of FIG. 1, with the letters of FIG. 1 corresponding to the particular waveforms shown in FIG. 4. The luminous spot on the tube surface of the flying spot scanner 1 will horizontally scan at a constant velocity under control of the horizontal scanning circuit 2. Now, when the lens system 8 is appropriately adjusted, the luminous spot projected on the optical film 3 will accurately and horizontally scan the optical film 3. When the optical film is supplied at a standard velocity and moves a distance L in time $T_1$ as shown in FIG. *3a*, by the capstan device 6, then the luminous spot on the optical film 3 will have vertically scanned by the vertical scanning circuit 20 so that the scope of the vertical scanning is $H_1 = 2L$ and the initiation point of the scanning will be at the upper edge of the video information recording portion, as shown by the solid lines 33 and 34 and that video information portion on the optical film will then have been accurately scanned.

As the luminous spot scans the optical film 3, the photoelectric transducer 9 will receive a photo-signal which is proportional to the variable density of the video information 21 recorded upon the optical film 3 and the synchronizing mark 22. The photo-signal received by the transducer 9 is then converted into an electrical signal and is amplified by the amplifier 10. It should be understood that the video information portion 21 of the amplified electrical signal is reproduced on the TV monitor 11 in synchronization with the scanning of the optical film 3. It should also be understood that after the synchronizing mark portion 22 has been scanned several times by the horizontal scanning circuit that the synchronizing mark signal will approximate a continuous and constant frequency.

Thus, the synchronizing mark signal which is separated by the synchronizing signal separator 12 will be of a waveform such as shown in FIG. 4A. The first pulse generating circuit 13 is triggered by the synchronizing mark signal so as to generate pulses, as shown in FIG. *4b*, having a pulse width $\tau_2$ which is higher than the duration $\tau_1$ of the synchronizing mark signal A. The second pulse generating circuit 14 generates pulses C having a pulse width of $\tau_3$, as shown in FIG. 4C. The second pulse generating circuit 14 is controlled so that the front edges of the pulses generated therefrom will be coincident with the back edges of the pulses shown in FIG. 4B. In accordance with the above, when the optical film 3 is run at a standard velocity, the frequency divider 15 is adjusted by the velocity controller 16 so that the frequency dividing ratio is 1. As such, the same pulse waveform, as shown in FIG. 4C, is applied to the first sawtooth wave generator 17 and to the second sawtooth wave generator 18. The amplitude controller 19 is then used to enable the peak value of the two sawtooth waveforms generated to coincide and have a period of $T_1$, a peak value of $E_1$, and a fly-back time of $\tau_3$, as shown in FIG. 4E. The two waveforms so generated are then applied to the vertical scanning circuit 20.

Now, if the peak value $E_1$ of one of the sawtooth waves is adjusted so as to vertically scan the optical film 3 for a distance such, for example, as L, then the peak value $E_1$ will be controlled to be $H_1 = 2L$ for the scope of vertical scanning of the composite sawtooth wave. The luminous spot on the optical film 3 will then accurately vertically scan the video information portion $P_1$ during the period $(T_1 - \tau_3)$, shown as 33 in FIG. 3a and during the next period $\tau_3$ shown as 34 in FIG. 3a, the luminous spot will jump over two frames of the video information portion so as to be accurately positioned at the upper edge of the next video information portion $P_2$. The above operations are then repeated.

When a slow-motion condition is desired, the following operation will take place. If, for example, the slow-motion ratio is one-third, then the running velocity of the optical film 3 will be adjusted to one-third of the standard velocity by adjusting the capstan driver 7 by the velocity controller 16. The frequency dividing ratio of the frequency divider 15 is also adjusted to one-third, so that a pulse D having the same phase and pulse width as the input pulse C will be generated only once for every three input pulses C. As such, the output of the first sawtooth wave generator 17 will generate the sawtooth waveform shown in FIG. 4E which is the same as that of the standard condition. However, the output of the second sawtooth wave generator 18 will generate the sawtooth waveform shown in FIG. 4F, which has a period of $T_2 = 3T_1$, a fly-back time of $\tau_3$, and a peak value of $E_1$.

It should be understood that the composite sawtooth waveform shown in FIG. 4G is obtained by composing the two sawtooth waveforms E and F. The amplitude of the composite sawtooth waveform G during the period $T_1$ is:

$$E_2 = E_1 [\ 1 + (T_1 - \tau_3)/(T_2 - \tau_3)] = 4/3\ E_1$$

as shown in FIG. 4G.

The scope of the vertical scanning during the period $T_1$ is 4/3L. On the other hand, the optical film will run at the rate of $1/T_2 = 1/3T_1$ frames per second, as shown in FIG. 3b, and the distance of movement for the period of time $T_1$ is:

$$(T_1 - \tau_3)/(T_2)L = (1/3)L$$

In view of the above, the scope that the luminous spot should scan vertically will be:

$$H_2 = L + (1/3)L = (4/3)L$$

It should now be apparent that the scope the scope that the luminous spot should scan vertically is coincident with the scope of vertical scanning of the composite sawtooth waveform G during the period $T_1 - \tau_3$, which is shown as 35 in FIG. 3b, and accordingly, during that period, the video information portion $Q_1$ will be accurately and vertically scanned. It should be further understood that during the next fly-back time $\tau_3$ shown as 36 in FIG. 3b, that the scope of vertical scanning will be given by the amplitude of the composite sawtooth waveform of:

$$E_3 = E_1 [1 - \tau_3/(T_2 - \tau_3)] = E_1 \text{ is } L.$$

On the other hand, the distance of movement of the optical film 3 for the period of time $\tau_3$ is $(\tau_3/T_2)L$ which is very small in comparison with the distance $L$. After such time, the luminous spot on the optical film 3 will be back at the upper edge of the video information portion $Q^1$.

After twice repeating the above-described e- described operation, namely, at the period wherein the fly-back time of the sawtooth waveform E coincides with the fly-back time of the sawtooth portion 37, shown in FIG. 3b, the scope of the vertical scanning which is determined by the amplitude of the composite sawtooth waveform G will be $E_4 - E_1 + E_1 = 2E_1$.

On the other hand, the distance of movement of the optical film 3 during the above period is $(\tau_3/T_2)L$ which is very small in comparison with the distance 2L. As such, the luminous spot on the optical film 3 will move over two frames of the video information portion so as to accurately be at the upper end of the next video information portion $Q_2$. The above operation can then be repeated. In general, when a slowmotion ratio of $1/n$ is desired, the sawtooth waveform F having a period $T_2 = nT$ will be generated with a frequency ratio of $1/n$ by the pulse frequency divider 15 such that slow-motion pictures may be accurately scanned and reproduced at the rate of $1/t_2 = 1/nT_1$ per second.

It should now be apparent that the apparatus for reproducing video information in accordance with the herein-described invention enables slow-motion reproduction from an optical film to be readily and accurately obtained by vertically scanning with a composite sawtooth wave signal composed out of two separate sawtooth wave signals.

Obviously, numerous modifications and variations of the present invention are possible in light of the above teachings. Thus, while in the embodiment shown a particular synchronizing mark 22 is disclosed, it should be understood that any synchronizing mark having a constant space of transparent and opaque vertical patterns can be readily employed with the number thereof being any desired amount. Likewise, any sawtooth waveform E or F having the same fly-back time and having coinciding fly-back times for every period which corresponds to a slow-motion ratio can be readily utilized. Moreover, while the present embodiment has been illustrated with the assumption that the fly-back time $\tau^3$ of the sawtooth waveform is of such a small value as to be negligible in comparison with the standard repeating period, it should be understood that it is enough to accurately scan the video information portion 21 and the synchronizing portion 22 by adjusting the peak wave values of the sawtooth waveforms E and F. Additionally, while the recording media of the present invention has been disclosed as being optical film, it should be understood that other recording media could be equally used such as of the thermoplastic type.

It is therefore to be understood, that within the scope of the teachings herein and the appended claims, the invention may be practiced otherwise than as specifically described.

What is claimed as new and desired to be secured by Letters Patent of the United States is:

1. An apparatus for reproducing video information from a recording media having video information recorded thereon comprising:

a flying spot scanning circuit driven by a horizontal scanner and a vertical scanning circuit for scanning said video information;

first and second sawtooth wave generators, each generating a sawtooth waveform signal having the same amplitude, and wherein both of said generators drive said vertical scanning circuit;

means coupled to said first sawtooth wave generator for controlling the period of the output waveform thereof;

means coupled to said second sawtooth wave generator for controlling the period of the output waveform of said second sawtooth wave generator so as to be a specific value depending upon the velocity of movement of said recording media;

means for mixing only said first and second sawtooth waveform signals in said vertical scanning circuit and for producing an output signal; and, means for applying said output signal of said means for mixing to said flying spot scanner such that said video information is reproduced in slow-motion by vertically scanning with said composite sawtooth wave signal in the direction of movement of said recording media.

2. An apparatus for reproducing video information according to claim 1, which further comprises:

a synchronizing signal generator for separating a synchronizing signal corresponding to a synchronizing mark from the signal obtained by scanning the video information recorded on the recording media with said flying spot scanner; and, a frequency divider for dividing said synchronizing signal at a pulse frequency pulse dividing ratio which corresponds to the velocity of movement of said recording media such that the period of the output signal of said second sawtooth wave generator is controlled by the output of said frequency divider.

3. An apparatus for reproducing video information from a recording media having video information and a synchronizing mark recorded thereon comprising:

a flying spot scanner driven by a horizontal scanner and a vertical scanning circuit for scanning said video information and said synchronizing mark;

a synchronizing pulse separator for separating a synchronizing signal corresponding to said synchronizing mark from the signal obtained by scanning said recording media with said flying spot scanner;

first and second sawtooth wave generators, each generating a sawtooth waveform signal having the same amplitude and wherein both of said generators drive said vertical scanning circuit;

means for controlling the period of the output waveform of said first sawtooth wave generator in response to said synchronizing signal;

a frequency divider for dividing said synchronizing signal at a frequency dividing ratio which corresponds to the velocity of movement of said recording media and for producing an output of a variable frequency, said second sawtooth wave generator being responsive to said output signal of said frequency divider to produce a second sawtooth waveform signal of a variable frequency;

means for mixing said first and second sawtooth waveform signals and for producing an output signal; and, means for applying said output signal of said means for mixing to the vertical scanning circuit of said flying spot scanner.

4. An apparatus for reproducing video information according to claim 3, which further comprises an amplitude controller for enabling the peak amplitude of the sawtooth wave signals generated from the first sawtooth wave generator and the second sawtooth wave generator to coincide.

5. An apparatus for reproducing video information according to claim 3, wherein the frequency dividing ratio is a fraction of the standard frequency.

* * * * *